| United States Patent [19] | [11] Patent Number: 4,732,743 |
| Schmidt et al. | [45] Date of Patent: Mar. 22, 1988 |

[54] PROCESS FOR CATALYTIC TREATMENT OF EXHAUST GASES

[75] Inventors: Torsten Schmidt, Berlin; Robert Walter, Langenhagen, both of Fed. Rep. of Germany

[73] Assignee: Kali-Chemie Aktiengesellschaft, Hanover, Fed. Rep. of Germany

[21] Appl. No.: 922,873

[22] Filed: Oct. 24, 1986

[30] Foreign Application Priority Data

Oct. 28, 1985 [DE] Fed. Rep. of Germany ....... 3538259

[51] Int. Cl.$^4$ .......................... B01J 8/00; C01B 17/00
[52] U.S. Cl. ..................................... 423/239; 423/235
[58] Field of Search .................. 423/235, 235 D, 239, 423/239 A

[56] References Cited

U.S. PATENT DOCUMENTS

| 2,975,025 | 3/1961 | Cohn et al. | 423/239 |
| 4,129,651 | 12/1978 | Koike et al. | 423/235 |
| 4,199,555 | 4/1980 | Itoh et al. | 423/239 |
| 4,307,068 | 12/1981 | Matsumoto et al. | 423/239 |
| 4,358,428 | 11/1982 | Fujita et al. | 423/239 |
| 4,403,473 | 9/1983 | Gladden | 60/274 |
| 4,423,017 | 12/1983 | Dean | 423/239 |

FOREIGN PATENT DOCUMENTS 0161470 11/1985 European Pat. Off.
3407277 8/1985 Fed. Rep. of Germany.

OTHER PUBLICATIONS

"Handbook of Chemistry and Physics", pp. B-72 and B-73 (1985-86 edition).
"Gmelins Handbuch Der Anorganischen Chemie", (Gmelins Handbook of Inorganic Chemistry), pp. 104, 108 & 266, 8th edition (1936).

*Primary Examiner*—Gregory A. Heller
*Attorney, Agent, or Firm*—Schwartz, Jeffery, Schwaab, Mack, Blumenthal & Evans

[57] ABSTRACT

A process and apparatus for removing nitrogen oxides ($NO_x$) from an exhaust gas by catalytic reduction in the presence of added ammonia in which at temperatures of up to 300° C. the exhaust gas is mixed with the ammonia in such a way that their residence time together before contacting the catalyst is at most one second.

14 Claims, 1 Drawing Figure

PROCESS FOR CATALYTIC TREATMENT OF EXHAUST GASES

The present invention relates to a process for removing nitrogen oxides ($NO_x$) from exhaust gases by catalytic reduction in the presence of added ammonia and to an apparatus for use in carrying out such a process.

Exhaust gases from thermal power plants and industrial installations such as nitrous acid plants contain undesirable amounts of nitrogen oxides ($NO_x$) such as nitric oxide or nitrogen dioxide. Such emissions burden the environment and must therefore be removed from the exhaust gases.

One group of known processes for removing nitrogen oxides from exhaust gases removes them catalytically in the presence of added ammonia. Of the many known catalytic reactors of this type, a large portion are sufficiently effective in actual practice only at high temperatures, e.g., at temperatures above 300° C. and higher. This manner of operation is disadvantageous, however, with regard to selection of suitable materials, expense of the apparatus which must be used, etc.

In processes which operate at temperatures under 300° C., during sustained operation an undesired deposition of inactive substances on the catalyst surfaces and consequent decrease in the catalyst activity occurs as well as escape of ammonia. This disadvantage is not avoided even if, as has been suggested, specific geometric limits for a honeycomb catalyst are maintained and a controlled exhaust gas velocity is additionally utilized.

SUMMARY OF THE INVENTION

It is the object of the present invention to provide a process for removing nitrogen oxides from exhaust gases which operates efficiently at lower temperatures.

Another object of the invention is to provide a process for removing nitrogen oxides from exhaust gases with a reduced tendency for inactivating deposits to form on the catalyst material.

A further object of the invention is to provide a process for removing nitrogen oxides from exhaust gases with a reduced tendency for ammonia to escape from the catalytic reactor.

It is also an object of the invention to provide a process for removing nitrogen oxides from exhaust gases which can be operated effectively and economically for sustained periods of time at lower temperatures.

Yet another object of the invention is to provide a process for removing nitrogen oxides from exhaust gases which can be adapted to a variety of catalyst configurations and operating conditions.

A still further object of the invention is to provide apparatus for removing nitrogen oxides from exhaust gases according to the process of the invention.

These and other objects of the invention are achieved by providing a process for removing nitrogen oxides ($NO_x$) from an exhaust gas comprising the steps of forming a mixture of ammonia and the exhaust gas and contacting the resulting mixture with a reducing catalyst at a temperature of up to 300° C. wherein the time between the formation of the mixture and the occurrence of contact between the mixture and the catalyst is at most 1 second.

In another aspect of the invention, the objects are achieved by providing apparatus for removing nitrogen oxides ($NO_x$) from an exhaust gas comprising a catalyst chamber containing a body of reducing catalyst having a front surface, a supply line for introducing exhaust gas containing $NO_x$ into said catalyst chamber, and means for mixing ammonia with said exhaust gas, said mixing means comprising injecting means arranged upstream of the catalyst front surface such that the time between mixing of the ammonia with the exhaust gas and the occurrence of contact between the resulting mixture of ammonia and exhaust gas with the catalyst is at most 1 second.

BRIEF DESCRIPTION OF THE DRAWINGS

The invention will be explained in further detail with reference to the accompanying drawing figure which is a schematic representation of an apparatus according to the invention for carrying out the process of the invention.

DETAILED DESCRIPTION OF PREFERRED EMBODIMENTS

Figure 1:
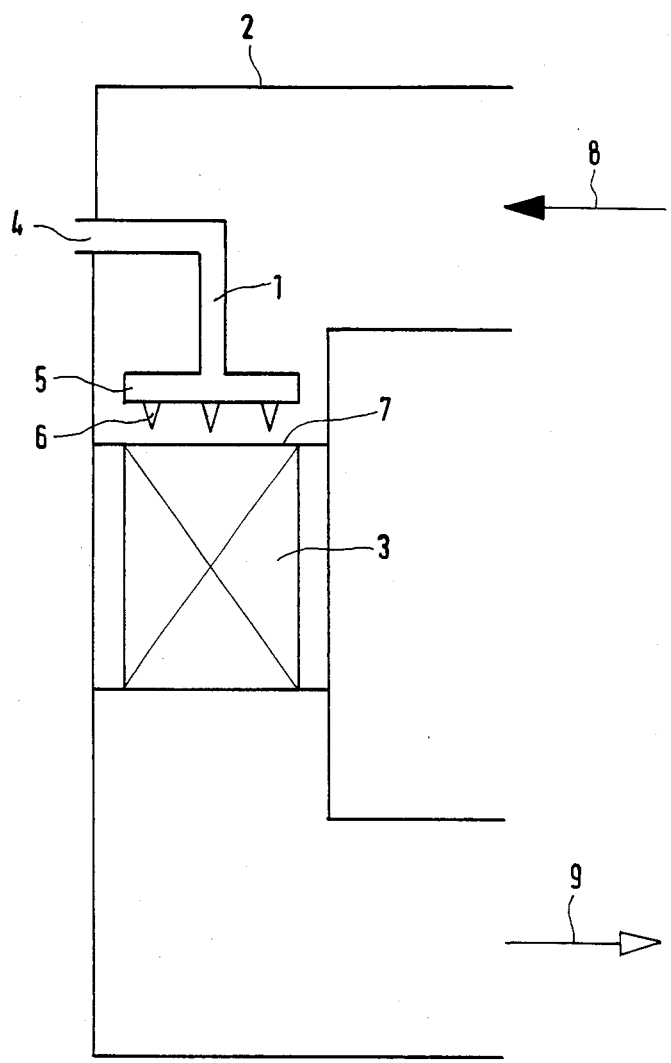

The process of the invention operates in accordance with the overall concept as a catalytic reducing process in the presence of added ammonia and is characterized in that operation is carried out at an exhaust gas temperature of up to 300° C. and ammonia and $NO_x$ containing exhaust gas are mixed in such a way that their residence time together before contact with the catalyst amounts at most to one second. Preferably their residence time together before contact with the catalyst is at most 0.2 second; particularly preferably at most 0.1 second.

The term "residence time together" (common residence time) is intended in accordance with the invention to refer to that time required for an $NH_3$ molecule to traverse the distance between the outlet from the $NH_3$ supply line and the front surface of the catalyst assuming plug flow conditions and, for purposes of computation only, a temperature of 273° K. in taking into account conditions such as rate of flow, reactor geometry, etc.

In conventional exhaust gas treatment processes, ammonia is added to the exhaust gas in static mixers, for example. The residence time of ammonia and $NO_x$ containing exhaust gas in these mixers together typically amounts to more than one second. Surprisingly, it is possible in the process of the present invention to largely avoid formation of inactivating deposits on the catalyst by means of the aforementioned, simple process measures. Without knowing the exact manner of operation, it is supposed that the generation and/or deposition on the catalyst of solid ammonium nitrate/ammonium nitrite, as well as of ammonium sulfate/ammonium sulfite from oxides of sulfor also present in the exhaust gas, is prevented by the procedure of the invention, i.e., by the shortening of the residence time together of the ammonia and the $NO_x$ containing exhaust gas.

Particular preferred embodiments of the process of the invention are characterized by one or more of the following features:

preferably they are carried out at an exhaust gas temperature in the range from 150° to 250° C., particularly preferably in the range from 150° to 200° C.;

preferably they are carried out at space velocities (amount of gas in cubic meters which passes per 1 hour through 1 cubic meter of the catalyst (apparent volume of the catalyst bed) stated with the dimension $hour^{-1}$) in the range from 5,000 to 20,000 $hour^{-1}$; particularly preferably in the range from 5,000 to 15,000 $hour^{-1}$.

preferably they are carried out with addition of from 0.5 to 1.5 parts by volume of ammonia per part by volume of $NO_x$ in the exhaust gas, particularly preferably with addition of less than 1 part by volume of ammonia per part by volume $NO_x$.

In one preferred embodiment, the addition of ammonia is regulated in accordance with the nitrogen oxide ($NO_x$) content in the exhaust gas stream which is to be treated. For this embodiment appropriate, well known measuring and control devices are provided. As an example, for continuous determination of the $NO_x$, a part of the resulting (i.e., treated) stream of gas can be branched off in which the $NO_x$ content can be continuously determined by chemoluminesence analysis, and this measured value can be used to control the addition of ammonia.

Known oxidation catalysts may be used as the catalysts in the invention. These may be used in all known forms, e.g., as webs, nets, screens, as loose material of formed or unformed particles. Preferably, catalysts affixed to porous supports or carriers are used, whereby the support or carrier preferably is formed in bead form, as an extrudate or in honeycomb form.

With regard to the catalyst, particularly preferred embodiments of the process of the invention are characterized by one or more of the following features:

the support material of the catalyst comprises silicon dioxide and/or alum-osilicate;

the catalytically active material is directly applied to the support material, i.e., without any inert or active intermediate layer;

in a honeycomb form catalyst, the open forward surface of the catalyst amounts to from 40 to 90 percent of the total forward surface;

in a honeycomb form catalyst, the hydraulic diameter (defined as four times the cross-sectional area of a flow channel divided by the length of the inner periphery of the flow channel) amounts to from 1 to 10 mm.

The term "honeycomb form catalyst" is intended in accordance with the invention to refer to every known cellularly constructed catalyst structure comprising a plurality of parallel channels separated from each other by separating walls of substantially uniform thickness.

In one embodiment of the invention, the active component of the catalyst is based on a noble metal, preferably a noble metal of the platinum group. A catalyst which contains platinum and/or palladium as the noble metal is preferred. In another embodiment of the invention, the active component of the catalyst is based on a transition metal oxide, preferably a transition metal of the fourth period. Catalysts based on oxides of V, Mn and/or Cu have proved particularly effective. Such catalysts are commercially available.

In a further preferred embodiment of the process of the invention, the catalyst is arranged in the direction of gas flow following (i.e., downstream of) a known dust separating device. This separating device may be constructed as an electronic filter, a cyclone or a wet separating (washing) stage.

The process of the invention may be the only treatment stage. But it can also be utilized as a component of a known combination of several treatment stages, as disclosed, for example, in West German published application DE-OS No. 31 07 117 or DE-OS No. 32 08 767. In a combination with the known alkali prewash step, it is preferred to use a noble metal catalyst with an $SiO_2$ and/or alum -oscilicate support.

With the process of the invention it is possible to treat an exhaust gas which contains $NO_x$ as the primary pollutant and/or an exhaust gas in which $NO_x$ is produced as an intermediate secondary pollutant from nitrogen containing primary pollutants. Such nitrogen containing pollutants may include, for example:

primary, secondary or tertiary aliphatic amines with alkyl residues, particularly of 1 to 6 carbon atoms, such as, for example, mono-, di- or tri-methyl, -ethyl, -n-propyl, or -n-butyl amines, mono- or di-isopropyl, isobutyl or sec-butyl amines, or tert-butyl amine;

cycloalkyl amines such as cyclohexyl amine, N-methyl- or N,N-dimethyl-cyclohexyl amine, or dicyclohexyl aniline;

diamines and polyamines such as mono-, di- or triethylene diamine;

cyclic amines such as piperidine, morpholine or N-methyl-N-ethylmorpholine;

aromatic amines such as aniline, toluidine, xylidine, aminophenol or benzylamine;

nitriles, particularly aliphatic nitriles such as acetonitrile, propionitrile, butyronitrile, acrylonitrile or methacrylonitrile;

nitro compounds, for example, aliphatic nitro compounds such as nitromethane, nitroethane, nitropropane or, for example, aromatic nitro compounds such as nitrobenzene or nitrotoluene;

nitrogen containing heterocycles such as pyridine or pyrrole;

amide derivatives such as, for example, N,N-dimethylformamide;

hydrogen cyanide.

The invention also includes within its scope apparatus for carrying out the process of the invention. The apparatus functions to produce a highly turbulent flow before entry into the catalyst. Due to the high local velocity differences arising in the highly turbulent gas stream, a rapid equilibration of concentration differences takes place.

The apparatus will be described in further detail with reference to the illustrative embodiment shown in FIG. 1. FIG. 1 shows the principal construction of the apparatus in a sectional view taken longitudinally along an exhaust gas line 2 The apparatus comprises ammonia supply lines 4 and 1 and ammonia distributor 5 as well as catalyst 3. Ammonia distributor 5 and/or ammonia supply lines 4 and 1 may be constructed in accordance with the invention either as a static system or as a dynamic system. In the construction of a dynamic system, ammonia distributor 5 and ammonia supply line 1 carry out a rotational movement in which the axis of rotation lies along the direction of flow of the gases. The kinetic energy for the rotational movement may be supplied by an external drive, or it may be derived from the flow energy of the exhaust gas stream and/or the ammonia stream. In order to make use of the flow energy of the exhaust gas stream, a suitable component part (e.g., a propeller) may be provided on the ammonia distributor 5 and/or the ammonia supply line 1. The flow energy of the ammonia stream may be utilized by suitably constructing and arranging injector nozzles 6 so that rotational torque is imparted to ammonia distributor 5 by the exiting ammonia streams.

The spacing between the injectors 6 and the front surface 7 of the catalyst material 3 is chosen such that the residence time together of the exhaust gas and the ammonia before contacting the front surface of the catalyst amounts at most to 1 second.

To produce a large impuse stream and a high impulse density, the velocity of the ammonia stream exiting from the injector means 6 must be adjusted to a high value, which, as a rule, is very much higher than the average velocity of the exhaust gas stream. Optionally, the rotational movement of the dynamic system is driven by the large impulse stream of the ammonia flow. The high impulse density produces a strong turbulence, which leads to rapid and uniform mixing of the ammonia stream and the exhaust gas stream. In order to achieve these conditions, it may be advantageous to premix the ammonia stream with suitable supplemental gases such as, for example, air.

Various forms of construction are possible for the structure of the ammonia distributor 5. It can be constructed as an annular conduit or be put together from a plurality of crossed, elongated or curved hollow bodies.

In any form of construction, the arrangement of the injection means must be chosen such that in operation the ammonia stream density is as uniform as possible over the entire receiving surface of the catalyst. In order to maintain this condition, it is also possible within the scope of the invention to use an arrangement of multiple ammonia distributors 5.

The apparatus according to the invention also comprises parts for mounting the device in exhaust gas conduit 2. In embodiments constructed as dynamic systems, suitable bearings should be provided between the rotating and the stationary parts. These may be located either inside, or also outside, the exhaust gas conduit.

In FIG. 1 the direction of flow of the untreated exhaust gas and of the treated exhaust gas is indicated by arrows 8 and 9, respectively.

In a particular embodiment of the process, especially when loose particle catalysts are used, ammonia may also be fed directly into the zone coated with catalytically active material.

The following examples serve to describe the invention in further detail, without, however, limiting its scope.

EXAMPLES

In an apparatus corresponding in principle to the arrangement illustrated in FIG. 1, an exhaust gas containing $NO_x$ and $SO_2$ was introduced having a space velocity of 10,000 hour$^{-1}$ through a honeycomb catalyst of noble metal (Catalyst=KCO WK 220 J produced by Kali-Chemie AG, Hannover, Germany). The ammonia distributor was an annular conduit arranged so that its spacing from the forward surface of the catalyst material could be adjusted.

By varying the residence time together of the exhaust gas and the ammonia and/or the mole ratio of $NH_3$ to $SO_2$, the following results were obtained, from which it can be seen that practically no formation of ammonium sulfate/ammonium sulfite took place (See column headed "$SO_2$ Conversion"). Similarly negligible amounts of ammonium nitrate/ammonium nitrite were formed. The degree of $NO_x$ removal was uniformly good in all cases.

| Residence Time Together | Mole ratio $NH_3:SO_2$ | Temperature | $SO_2$-Conversion |
|---|---|---|---|
| 0.07 s | 1 | 200° C. | 0% |
| 0.15 s | 1 | 200° C. | 1% |
| 1.0 s | 1 | 200° C. | 1% |
| 0.07 s | 5 | 200° C. | 0% |
| 0.15 s | 5 | 200° C. | 4% |
| 1.0 s | 5 | 200° C. | 5% |

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with respect to the appended claims and equivalents.

What is claimed is:

1. A process for removing nitrogen oxides ($NO_x$) from an exhaust gas largely avoiding formation of inactivating deposits on the catalyst comprising the steps of forming a mixture of ammonia and the exhaust gas and contacting the resulting mixture with a reducing catalyst at a temperature from about 150° to 250° C. wherein the time between the formation of the mixture and the occurrence of contact between the mixture and the catalyst is at most 1 second.

2. A process according to claim 1, wherein the time between formation of the mixture and the occurrence of contact between themixture and the catalyst is at most 0.2 second.

3. A process according to claim 1, wherein the process is carried out at an exhaust gas temperature of from about 150° C. to 200° C.

4. A process according to claim 1, wherein the space velocity of the mixture is from about 5,000 to 20,000 hours$^{-1}$.

5. A process according to claim 1, wherein said reducing catalyst is disposed on a support formed of material selected from the group consisting of $SiO_2$, alumosilicate, and mixtures thereof.

6. A process according to claim 1, wherein said catalyst is a noble metal catalyst.

7. A process according to claim 6, wherein said noble metal is a noble metal of the platinum group.

8. A process according to claim 1, wherein said catalyst is a transition metal oxide catalyst.

9. A process according to claim 8, wherein said transition metal is a transition metal of the fourth period of the periodic table of elements.

10. A process according to claim 1, wherein said reducing catalyst comprises a support material which is directly coated with a catalytically active component.

11. A process according to claim 1, wherein said catalyst is formed as a honeycomb material.

12. A process according to claim 1, wherein said exhaust gas is first passed through a dust separating device before contacting the catalyst.

13. A process according to claim 1, wherein from 0.5 to 1.5 parts by volume of ammonia are added to the exhaust gas per part by volume of $NO_x$ present in the exhaust gas.

14. A process according to claim 1, wherein less than 1 part by volume of ammonia is added to the exhaust gas per part by volume of $NO_x$ present in the exhaust gas.

* * * * *